UNITED STATES PATENT OFFICE.

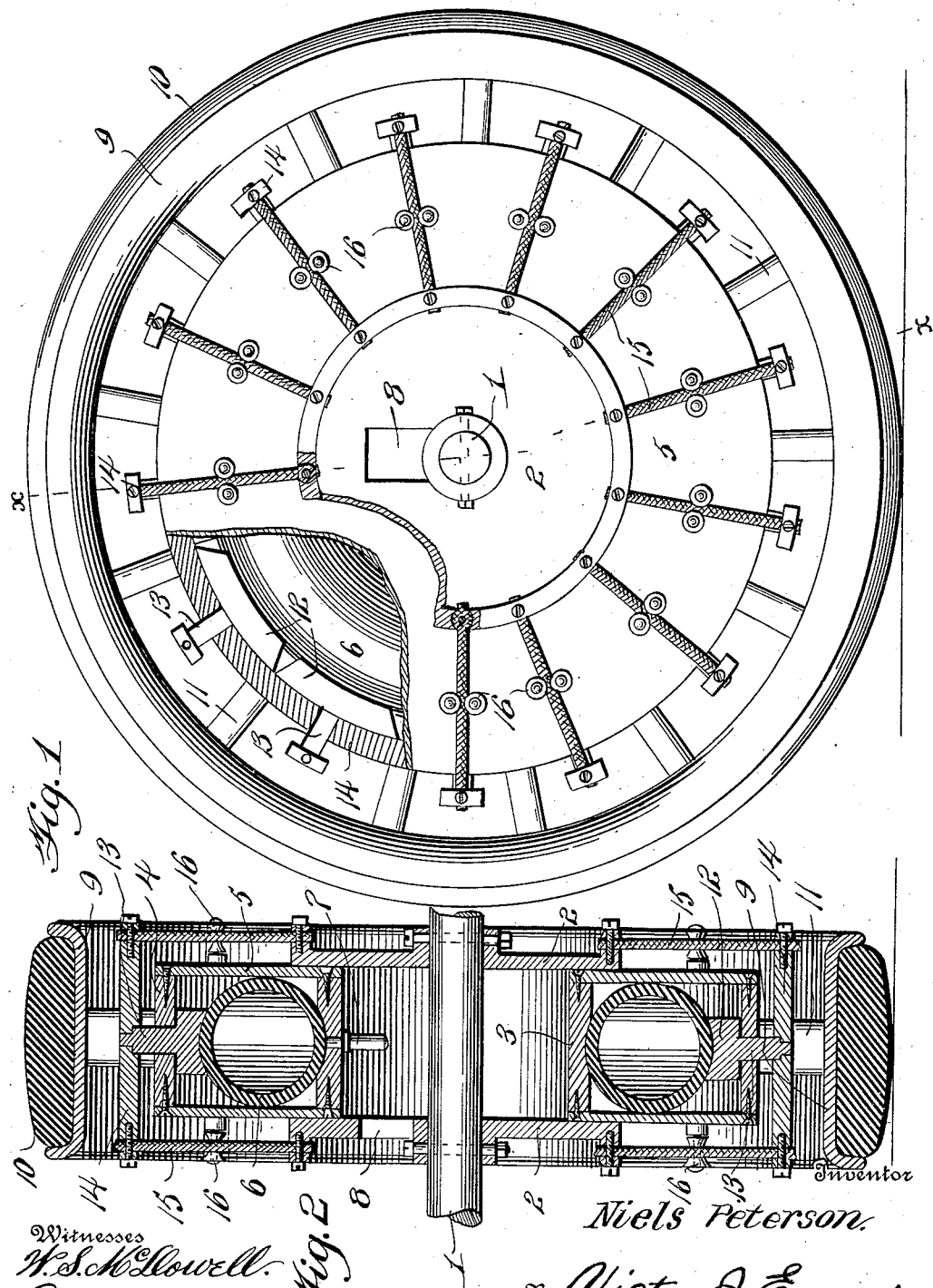

NIELS PETERSON, OF TETON, IDAHO.

PNEUMATIC WHEEL.

1,060,854.  Specification of Letters Patent.  Patented May 6, 1913.

Application filed December 27, 1911. Serial No. 668,021.

*To all whom it may concern:*

Be it known that I, NIELS PETERSON, a citizen of the United States, residing at Teton city, in the county of Fremont and State of Idaho, have invented new and useful Improvements in Pneumatic Wheels, of which the following is a specification.

The invention provides a wheel particularly adapted for automobiles and mechanically propelled machines generally, since it embodies a yieldable tread capable of absorbing shock and vibration to an extent equal only by a pneumatic tire and which is free from the annoyance and inconvenience attributable to puncture.

The invention provides a wheel embodying a pneumatic cushioning device which neutralizes the usual shock thereby enabling the wheel to possess all the advantages obtained by the use of pneumatic tires.

The invention further contemplates a wheel embodying a hub and tread portions between which is interposed a pneumatic cushioning device of annular form, the parts being arranged to sustain lateral stress while at the same time admitting of the component parts of the wheel having a relative yielding movement to compensate for jar and jolt.

The invention consists of the novel features, details of construction and combination of parts, which hereinafter will be more particularly set forth, illustrated in the accompanying drawing and pointed out in the appended claims.

Referring to the drawing, forming a part of the specification: Figure 1 is a side view of a spring wheel embodying the invention, a portion being broken away. Fig. 2 is a section on the line x—x of Fig. 1.

Corresponding and like parts are referred to in the following description, and indicated in all the views of the drawing by the same reference characters.

The numeral 1 designates an axle to which is secured the hub portion of the wheel which, in the present instance, is shown as consisting of two plates or disks 2 which are spaced apart, and which have outwardly extending flanges at their peripheral edges. A ring 3 is arranged between the plates 2 and is free to move therebetween toward and away from the axle 1. A second ring 4 concentric with the ring 3 is connected thereto by means of side rings 5, the latter occupying a parallel position and spaced apart a distance corresponding with the distance between the inner faces of the plates 2. A pneumatic cushioning device 6 is located in the space inclosed between the inner and outer rings 3 and 4, and the side rings 5 and consists of a tube which is adapted to be inflated in the ordinary manner. The air valve 7 is located upon the inner side of the tube 6 and extends through the inner ring 3 and is adapted to be reached through a hand hole 8 formed in one of the plates 2.

The rim 9 forming the tread of the wheel may be of any construction and as illustrated is channeled and receives a tire 10 which may be of any construction. Spokes 11 connect the rim 9 with the ring 4. Shoes 12 are arranged on the inner side of the ring 4 in contact with the outer side of the pneumatic cushioning device or tube 6. Stems 13 project outwardly from the shoes 12 and pass through openings formed in the ring 4 and are provided at their outer ends with short cross bars 14. Cables or flexible connections 15 have their outer ends attached to the terminal portions of the cross bars 14 and their inner ends secured to the flanged portions of the plates or disks 2. Guide rollers 16 are provided in pairs and are mounted upon the side rings 5 and engage the cables or connections 15 intermediate of their ends. The connections 15 limit the relative circumferential play between the hub and rim or tread portions of the wheel. It is understood that the rim portion of the wheel has a two-fold movement, the one perpendicularly to compensate for shock and vibration and the other circumferentially to allow for overcoming inertia particularly when the wheel is used as a driver. The load is transferred to the pneumatic tube or cushioning device 6 through the instrumentality of the shoes 12. The rings 3, 4 and 5 inclose a space and form in effect an annular hollow member which receives and protects the pneumatic cushioning device, said hollow member having limited play between the plates 2 of the hub portion of the wheel.

It is to be observed that the wheel possesses all the equalities of a pneumatic tire for absorbing shock, vibration and jolt, while at the same time it is free from objections incident to puncture. These results arise from the use of the pneumatic cushioning device and the latter is protected from injury by being housed in the hollow annular member in the manner stated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

I claim:—

1. In a vehicle wheel, the combination of transversely spaced disks having their inner faces parallel, an inner ring movable between said disks, an annular cushioning device mounted upon the inner ring, a plurality of shoes placed against the outer side of the annular cushioning device, an outer ring concentric with the inner ring and connected therewith and constituting guide and spacing means for the said shoes, cross bars exterior to the outer ring and having connection with the shoes, flexible connections between the outer ends of the cross bars and the said disks, guides having connection with the inner and outer rings to move therewith and engaging the flexible connections between their inner and outer ends, and a rim exterior to the cross bars and connected with the before mentioned outer ring.

2. In a vehicle wheel, the combination of transversely spaced disks having their inner faces parallel, an inner ring movable between the said disks, an outer ring concentric with the inner ring, connections between the edges of the concentric rings, an annular cushioning device mounted upon the inner ring, shoes placed against the outer side of the annular cushioning device and having stems passing loosely through said outer ring, cross bars at the outer ends of said stems, flexible connections between the ends of the cross bars and the said disks, guides mounted upon the connections between the concentric rings and engaging the flexible connections intermediate of their ends, and a rim exterior to the cross bars and connected with the before mentioned outer ring.

3. In combination transversely spaced disks having their inner faces parallel, an inner ring movable between the disks, an outer ring concentric with the inner ring, side rings connecting the concentric rings, pairs of guides projecting outwardly from the side rings, an annular cushioning device supported upon the inner ring, shoes placed against the outer side of the annular cushioning device and having stems passing loosely through the outer ring, cross bars secured to the outer ends of the stems, flexible connections between the ends of the cross bars and the before mentioned disks and passing between the elements of the respective pairs of guides, and a rim exterior to the cross bars and connected with the before mentioned outer ring.

4. In combination an axle, parallel disks secured to the axle and having outer flanges at their outer edges, an inner ring movable tween the disks, an outer ring concentric with the inner ring, side rings connecting the concentric rings, an annular pneumatic cushioning device mounted upon the inner ring, shoes placed against the outer side of the cushioning device and having stems passing loosely through openings in the outer ring, cross bars secured to the outer ends of the stems, flexible connections between the outer ends of the cross bars and the outer flanges of the disks, pairs of guide rollers carried by the side rings and engaging the flexible connections, and a rim encircling the outer ring and connected thereto.

In testimony whereof I affix my signature in presence of two witnesses.

NIELS PETERSON.

Witnesses:
OLIVE STONE,
JOHN W. GARDNER.

---

Copies of this patent may be obtained for five cents each, by addressing the "Commissioner of Patents, Washington, D. C."